(12) United States Patent
Takahashi et al.

(10) Patent No.: US 6,609,959 B2
(45) Date of Patent: Aug. 26, 2003

(54) DISK CLEANER

(75) Inventors: Toshio Takahashi, Tokyo (JP);
Shigekatsu Magaki, Kanagawa (JP);
Masayuki Kimura, Tokyo (JP)

(73) Assignee: Kioritz Corporation, Tokyo (JP)

( * ) Notice: Subject to any disclaimer, the term of this patent is extended or adjusted under 35 U.S.C. 154(b) by 116 days.

(21) Appl. No.: 09/817,472

(22) Filed: Mar. 26, 2001

(65) Prior Publication Data

US 2001/0027084 A1 Oct. 4, 2001

(30) Foreign Application Priority Data

Mar. 28, 2000 (JP) .................................. 2000-089714

(51) Int. Cl.[7] ................................................ B24B 7/00
(52) U.S. Cl. ........................ 451/65; 451/285; 451/456
(58) Field of Search .......................... 451/63, 65, 285, 451/290, 359, 456, 453

(56) References Cited

U.S. PATENT DOCUMENTS

| 4,047,913 A | 9/1977 | Okumura ..................... 55/418 |
| 4,179,852 A | 12/1979 | Barnett ....................... 51/132 |
| 4,561,142 A | 12/1985 | Mischenko et al. ......... 15/97 R |
| 4,783,870 A | 11/1988 | Yeung ........................ 15/97 R |
| 4,825,497 A | 5/1989 | Nagao et al. ............... 15/97 R |
| 4,947,505 A | 8/1990 | Hood .......................... 15/246 |
| 5,102,099 A | 4/1992 | Brown et al. ................. 51/129 |
| 5,593,343 A | 1/1997 | Bauer ......................... 451/254 |
| 5,651,160 A | 7/1997 | Yonemizu et al. ............ 15/302 |
| 5,938,510 A | 8/1999 | Takahashi et al. .......... 451/290 |
| 6,312,320 B2 * | 11/2001 | Sato et al. ................... 451/285 |
| 6,322,430 B1 * | 11/2001 | Kennedy et al. ............. 451/287 |
| 6,386,946 B1 * | 5/2002 | Lin et al. ....................... 451/7 |

FOREIGN PATENT DOCUMENTS

| JP | 62222479 | 9/1987 |
| JP | 7098960 | 4/1995 |

* cited by examiner

*Primary Examiner*—Robert Rose
(74) *Attorney, Agent, or Firm*—Baker Botts LLP

(57) ABSTRACT

A disk cleaner includes a polishing member that is rotated while it is pressed against a surface of a disk to be polished to thereby polish the surface of the disk and an air cooling apparatus that cools the disk by causing outside air to flow along the surface of the disk. The air cooling apparatus is incorporated integrally with the disk cleaner. The cooling apparatus inhibits the peeling of the adhered surfaces as well as the generation of cracks of a DVD of a two-ply structure.

5 Claims, 10 Drawing Sheets

DISK CLEANER

BACKGROUND OF THE INVENTION

The present invention relates to a disk cleaner of the type used to remove scars or stains formed on the surface of an information recording disk, such as an optical disk or a photo-electromagnetic disk. More particularly, the present invention relates to a disk cleaner that has a polishing member which is rotated while it is pressed against the surface of a disk to be polished so as to polish the surface of the disk. A disk cleaner according to the present invention is especially suited for polishing a multi-layer DVD disk.

In recent years, various kinds of disks, such as laser disks, compact disks (CDs), CD-ROMs, DVDs, and the like, have been used extensively as information recording mediums for audio/video devices and for computers. If scars or stains are formed on the surfaces of the disks, especially on the recording surfaces, they not only become unsightly, but also it becomes difficult to read out and properly reproduce the recorded information of the portion of the disk where scars or stains are formed.

It is well-known to remove scars or stains formed on the disks manually using a cloth. However, manual cleaning not only takes a lot of work and time, but it is also difficult to satisfactorily remove the scar or stain. Especially, in the secondhand disk shops or libraries were a great number of disks are stored and frequently reshuffled or lent, a lot of work is required for removing scars or stains from the disks. Therefore, there is a need in the secondhand disk shops and libraries to develop a method which makes it possible to mechanically and automatically remove the scars or stains from the disks instead of removing them manually.

In response to such a need, Japanese Patent Unexamined Publication H7-122038 proposes a disk cleaner that has a cylindrical polishing member, which is arranged to be rotated while the end face portion thereof is pressed against the surface (recording surface) of a disk to be polished so as to polish the surface (recording surface) of the disk while the disk is rotated.

There is also proposed in Japanese Patent No. 3007566 a disk cleaner that has a cylindrical polishing member that is rotated while it is pressed against the surface of the disk, with the rotational axis of the polishing member being positioned perpendicular to the surface of the disk. There is also known, as a modification of the aforementioned disk cleaner, another type of disk cleaner, in which a cylindrical polishing member which is rotated while it is pressed against the surface of a disk to be polished, is positioned with its axis of rotation perpendicular to the surface of the disk so as to cause the disk to rotate by a frictional force imposed between the polishing member and the disk surface, thus polishing the surface of the disk (see Japanese Patent Unexamined Publication 2000-11601).

Previously known disk cleaners have the following problems when they are used to polish a DVD. A DVD is constituted by a pair of disk substrates (an upper layer and a lower layer), each being of about half the thickness of a CD (about 0.6 mm), which are joined by means of an adhesive with their recording surfaces facing each other. Therefore, when a DVD is polished using any one of the aforementioned disk cleaners wherein a polishing member is rotated while it is pressed against the surface of the DVD (disk) to be polished after mounting the DVD on a turntable, the surface being polished (the upper layer) of the disk is heated due to the friction between the polishing surface and the polishing member during the polishing operation. In this case, since the DVD is formed of a two-ply adhesively joined structure, the upper layer becomes heated to a higher temperature (the surface temperature becomes about 70° C.) than the lower layer, which causes a difference in expansion between the upper layer and the lower layer, thereby giving rise to such problems that the adhered surfaces may be separated from each other and that cracks may be radially generated at the inner peripheral portion (central portion) of the DVD.

BRIEF SUMMARY OF THE INVENTION

The present invention has been made with a view to overcoming the aforementioned problems. It is an object of the present invention, in particular, to provide a disk cleaner which is capable of preventing, as much as possible, the separation of the adhered surfaces and the forming of cracks, even though the disk to be polished is a DVD of a two-ply structure.

The foregoing object is attained, in accordance with the present invention, by a disk cleaner having a polishing member that is rotated while it is pressed against a surface of a disk to be polished to thereby polish the surface of the disk and an air cooling apparatus that cools the disk by causing outside air to flow along the surface of the disk, the air cooling apparatus being incorporated integrally with the disk cleaner.

In a preferred embodiment, the disk cleaner has a main body on which the polishing member is mounted, and the air cooling apparatus is attached to the main body. The air cooling apparatus includes a blower that generates an air flow, which, preferably, is caused to pass generally diametrically across the surface of the disk.

The main body may include a lower housing having an upper plate and an upper housing having a lower plate, the plates being arranged to form a substantially closed space in the main body. A hinge joins the upper housing to the lower housing such that the upper housing is movable away from the lower housing by pivoting about the hinge. A turntable for supporting the disk is disposed in the closed space, and the polishing member is supported in the upper housing and is received in the closed space.

Preferably, the air cooling apparatus is associated with the lower housing, and an air flow generated by the air cooling apparatus is introduced into the closed space from an air inlet port formed in the upper plate of the lower housing, is directed to flow generally diametrically across the disk, and is discharged outside the main body.

The main body may be provided with an air discharging structure for discharging the air that has been used for cooling the disk out of the main body. Advantageously, the air discharging structure is provided with an air cleaner for trapping shavings of the disk and dust of the polishing member.

The rotational axis of the polishing member may be positioned perpendicular to the surface of the disk at the time of polishing the disk so as to cause the disk to rotate in one direction by a frictional force generated between the polishing member and the surface of the disk. In such a design, a present magnitude of load is imposed on the disk for controlling the rotation of the disk in one direction which results from a frictional force between the polishing member and the surface of the disk. For example, a loading fan may be arranged to be driven in association with the rotation of a turntable on which the disk is to be mounted, thereby applying a load to the disk that controls the rotation of the turntable.

In preferred embodiments of a disk cleaner according to the present invention that have been constructed as described above, the flow of outside air produced by the air-cooling apparatus cools the disk so that the temperature rise due to the frictional heating of the disk during the polishing thereof is suppressed. Therefore, even if the disk being polished is a DVD of a 2-ply structure, it is possible to inhibit not only the peeling of the adhered surfaces but also the generation of cracks.

Since the air flow generated by the air cooling apparatus is allowed to flow generally diametrically across the disk which is being rotated, it becomes possible to effectively and uniformly cool the entire region of the disk.

Moreover, the air flow generated by the air cooling apparatus can be utilized as a trapping air flow for trapping the shavings of the disk or the dust of polishing material which will be generated during the polishing of the disk, thereby making it possible to remove the shavings and dust from the periphey of the disk. Thus, it is no longer required to separately install any additional fan for trapping the shavings and dust.

DETAILED DESCRIPTION OF THE INVENTION

Figure 1:
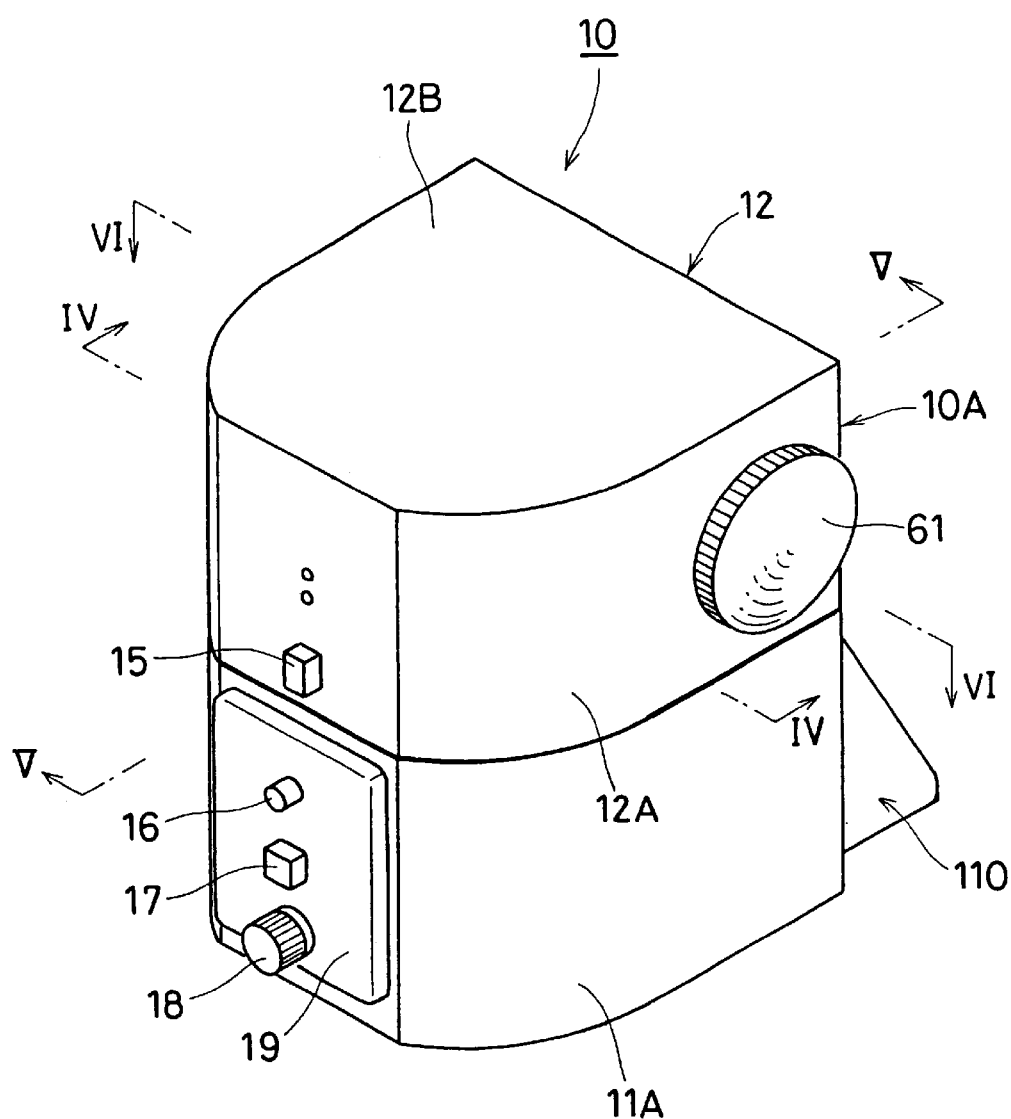
FIG. 1 is a perspective view of a disk cleaner representing one embodiment according to the present invention, the view taken from a vantage point in front of, to the right side of, and above and showing the upper housing in its closed position.
Figure 2:
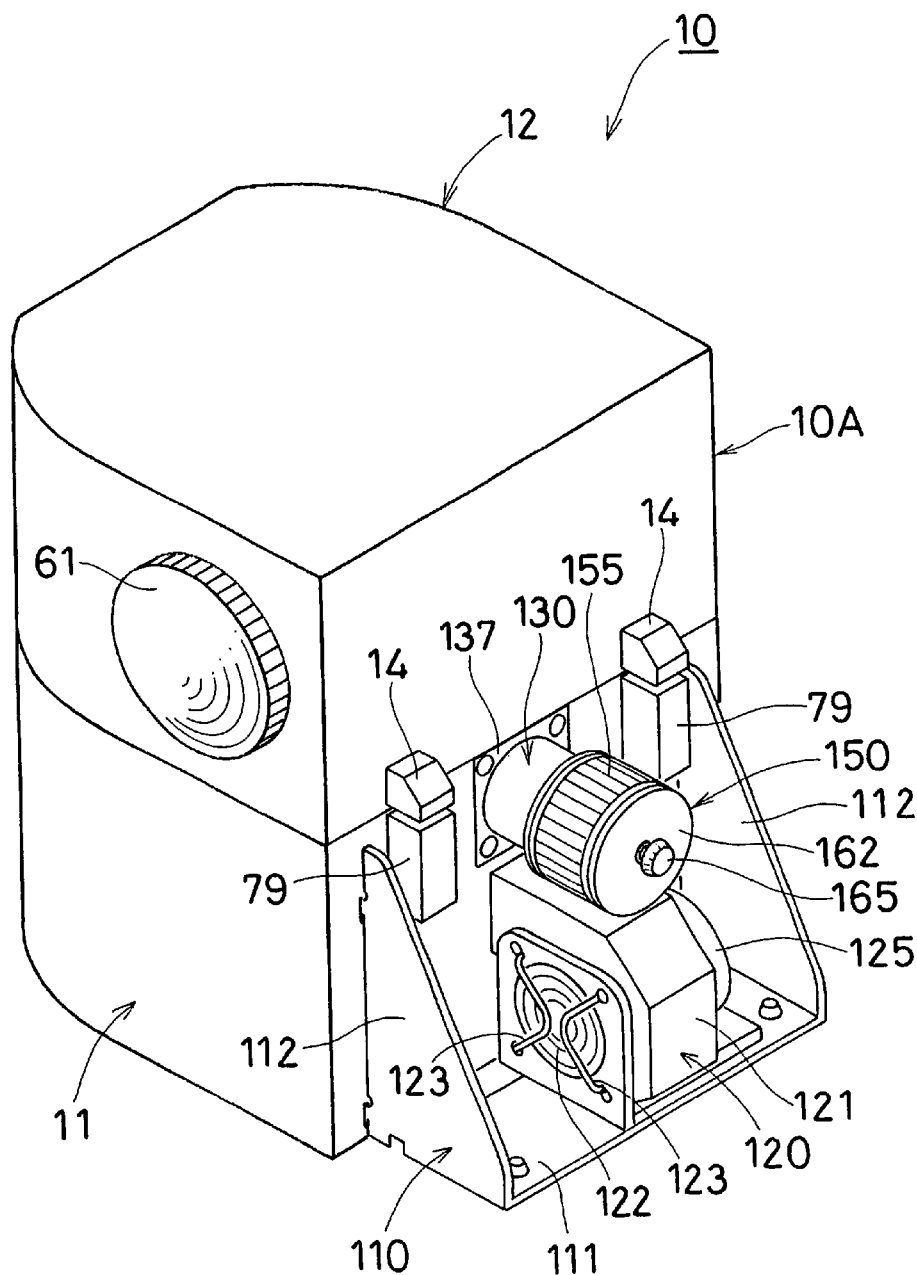
FIG. 2 is a perspective view showing the disk cleaner of FIG. 1, the view taken from a vantage point to the rear of, to the right side of, and above and showing the upper housing in its closed position.

One embodiment of the present invention will be explained with reference to the attached drawings as follows. Referring to FIGS. 1 and 2, a disk cleaner 10, which is adapted to be used for polishing a disk such as a CD or a DVD, comprises a main body 10A constituted by a disk cleaning portion, a blower 120 acting as an air cooling apparatus and attached to the rear side of the main body 10A, and an air-discharging pipe 130 acting as an air discharging arrangement.

Figure 3:
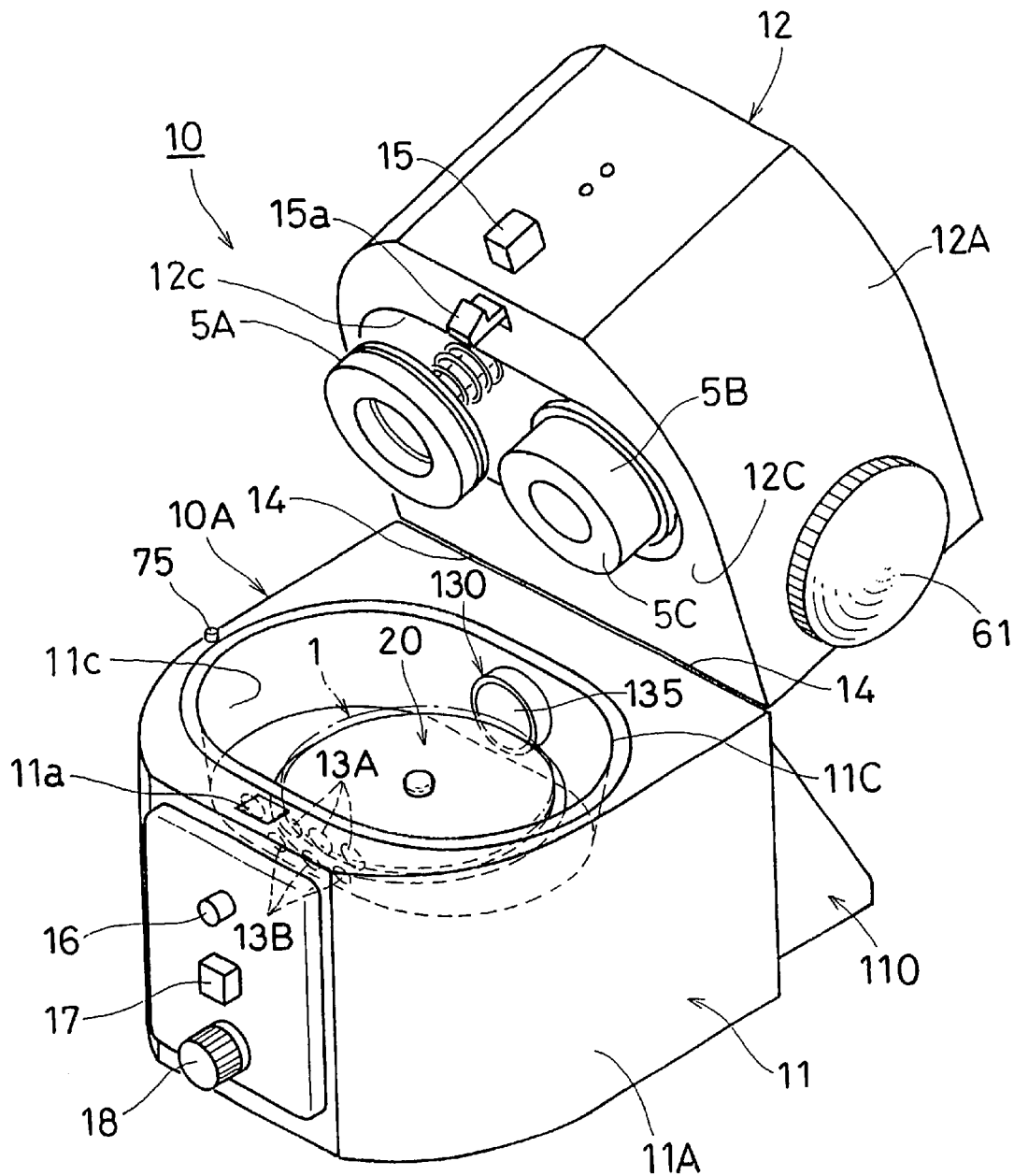
FIG. 3 is a perspective view similar to that of FIG. 1 but with the upper housing of the main body pivoted to an open position.

As clearly seen from FIG. 3 in addition to FIGS. 1 and 2, the main body 10A comprises a lower housing 11 and an upper housing 12 whose back sides are joined by hinges 14, thereby enabling the upper housing 12 to be opened upwardly by pivoting about the hinge members 14 (FIG. 3 shows a state wherein the upper housing 12 is opened to the maximum). Further, as clearly seen from FIGS. 4 to 7, the lower housing 11 includes an upper plate 11C having a dished recess 11c, a peripheral plate 11A having a semi-elliptical configuration and permitting the upper plate 11C to be fitted therein through an upper surface portion thereof, a bottom plate 11B, and an inner retaining plate 11D. The upper housing 12 is constituted by a peripheral plate 12A having a semi-elliptical configuration, a top plate 12B, and a bottom plate 12C having an inverted dished recess 12c.

Inside the lower housing 11, there is disposed a rotatable axle 25 which is perpendicularly secured to the inner retaining plate 11D by means of a retaining sleeve 28. A spindle 26 is screw-engaged with an upper portion of the rotatable axle 25. The spindle 26 protrudes into the closed space S formed between the upper surface of the upper plate 11C and the bottom plate 12C of the upper housing 12, and a turntable 20 designed to mount a disk 1 thereon and consisting of a substrate 21 and a rubber plate 23 is secured via a table retaining member 27 to the spindle 26, the disk 1 being mounted on the turntable 20 in such a manner that the recording surface (the surface to be polished) thereof is directed upward, while the non-recording surface (the surface where a label is adhered) thereof is directed downward. Further, ball bearings 86 and 87 which are capable of supporting thrust loads are interposed between the table retaining member 27 and the rotatable axle 25.

A rotation detecting disk 81 is rotatably and integrally attached to a portion of the rotatable axle 25 which is located below the place where the lower ball bearing 87 is disposed, the disk 81 being provided with a predetermined number of slits which are formed equiangularly or equidistantly along the circumference of the rotation detecting disk 81 so as to enable the rotational speed of the turntable 20 to be detected. Thus, a rotation detector 80 composed of a hole IC for instance for detecting the rotational speed of the rotation detecting disk 81 is disposed to face one side of the rotation detecting disk 81.

A cylindrical spacer 84 and a fan-driving wheel 90 are externally fitted to a portion of the rotatable axle 25 which is located below the place where the rotation detecting disk 81 is disposed. The rotation detecting disk 81, cylindrical spacer 84 and fan-driving wheel 90 are all fastened to the rotatable axle 25 by means of a nut 85 which is screwed onto a lower portion of the rotatable axle 25 so as to enable them to rotate with the rotatable axle 25.

An elastic ring 92 made of an elastic material such as rubber is stretchedly fitted in the circumferential groove 91 of the fan-driving wheel 90. On one side of the fan-driving wheel 90, there is disposed a loading fan 100 which is rotatably supported by a supporting member 95 which is secured via a pivot axis 94a to a mounting member 94 fixed to the inner retaining plate 11D.

As described hereinafter, the loading fan 100 is provided for the purpose of imposing a preset magnitude of load on the fan-driving wheel 90 so as to suppress the rotation of the disk D. The rotatable axle 101 of the loading fan 100 is provided with a gripping portion 102 such as teeth, thereby permitting the elastic ring 92 of the fan-driving wheel 90 to intrude into the gripping portion 102 as the elastic ring 92 is press-contacted with the gripping portion 102 by means of the pressing force effected by a spring 94b which is wound around the pivot axis 94a.

Therefore, as the turntable 20 is rotated, the rotational driving force thereof is transmitted, via the rotatable axle 25 and the fan-driving wheel 90, to the gripping portion 102, thereby driving the loading fan 100 to rotate.

Four guiding rods 41, 42, 43 and 44 are perpendicularly disposed inside the upper housing 12 so as to connect the top plate 12B with the bottom plate 12C. Among the guiding rods 41 to 44, a pair of guiding rods 41 and 42 which are positioned on the left side in FIGS. 4 and 6 function to support and guide a left side slidable elevating member 31 which is provided with a gear motor 35A for rotationally driving a scar-removing (roughing) polishing member 5A (to be explained hereinafter), the slidable elevating member 31 being enabled to slidably move up and down along the guiding rods 41 and 42. A pair of guiding rods 43 and 44 which are positioned on the right side in FIGS. 4 and 6 function to support and guide a right side slidable elevating member 32 which is provided with a gear motor 35B for rotationally driving a buffing polishing member 5B (to be explained hereinafter), the slidable elevating member 32 being enabled to slidably move up and down along the guiding rods 43 and 44.

The left side slidable elevating member 31 further comprises, in addition to the aforementioned gear motor 35A, a pair of slidable sleeves 37 which are slidably and externally fitted on the guiding rods 41 and 42 respectively, a left mounting plate 66 disposed so as to pair the slidable sleeves 37 with the gear motor 35A, a U-shaped left cam lift plate 67 attached to the left mounting plate 66, and a polishing member holder 50A for holding the scar-removing polishing member 5A which is disposed below the gear motor 35A.

The right side slidable elevating member 32 further comprises, in addition to the aforementioned gear motor 35B, a pair of slidable sleeves 37 which are slidably and externally fitted on the guiding rods 43 and 44 respectively, a right mounting plate 68 disposed so as to pair the slidable sleeves 37 with the gear motor 35B, a U-shaped right cam lift plate 69 attached to the right mounting plate 68, and a buffing polishing member holder 50B for holding the buffing polishing member 5B which is disposed below the gear motor 35B.

Figure 9:
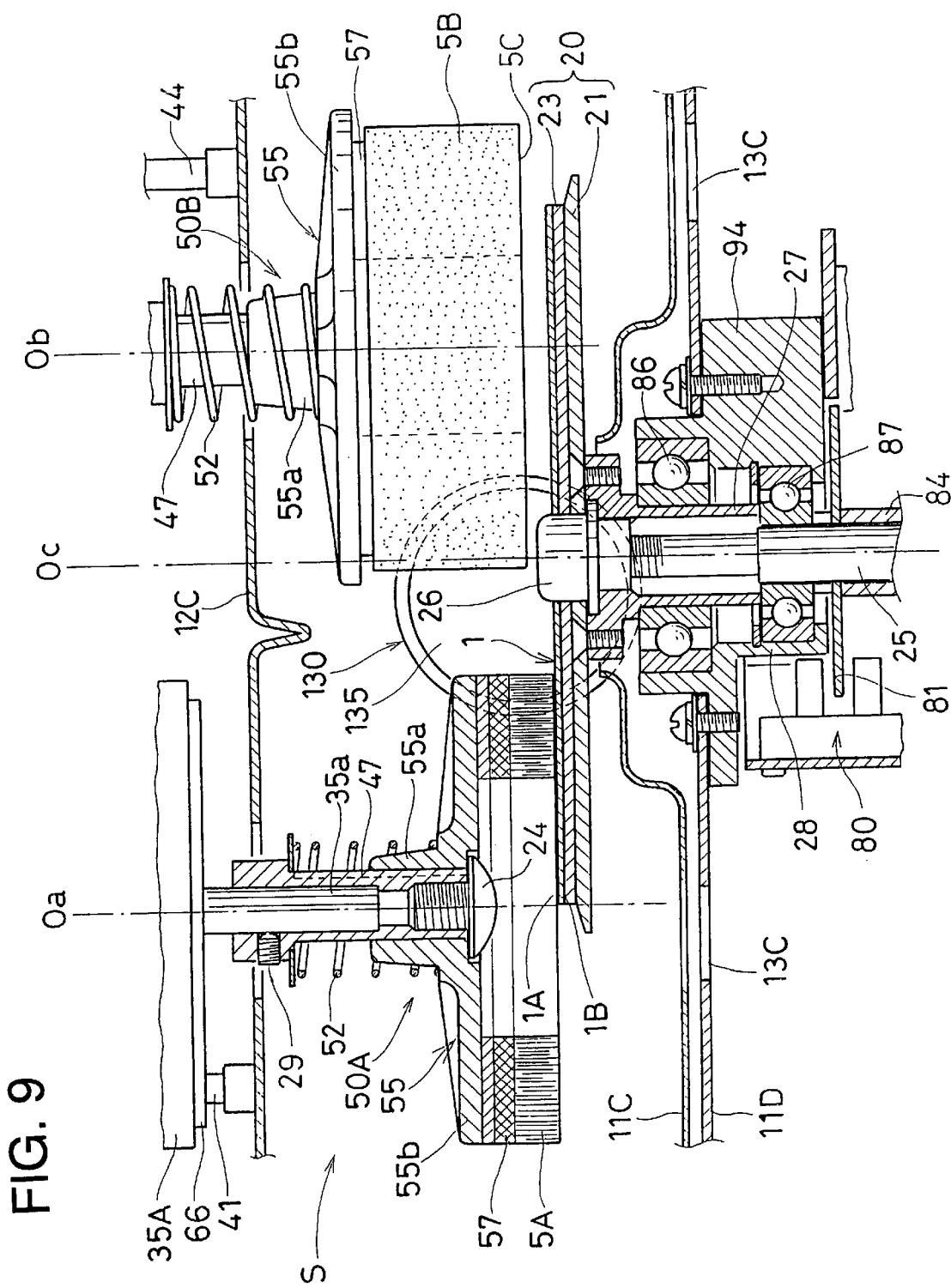
FIG. 9 is an enlarged cross-sectional view showing the polishing member-holding tool shown in FIG. 4.

The polishing member holders 50A and 50B which are attached to the left and right side slidable elevating members 31 and 32, respectively, are constructed in the same manner with each other, and as clearly seen from FIG. 9, they are respectively composed of: a stepped linking shaft 47 which is rotatably and integrally fixed by means of a fixing screw 29 to the output shaft 35a of each of the gear motors 35A and 35B; a slidable holder 55 constituted by a stepped barrel portion 55a which is adapted to be engaged with the umbrella-shaped head of a screw 24 screwed into a lower portion of the linking shaft 47, and a flange portion 55b attached contiguously to a lower end of the barrel portion 55a; and a coil spring 52 compressively interposed between the stepped portion of the barrel portion 55a of the slidable holder 55 and the stepped portion of the linking shaft 47. The slidable holder 55 is normally urged downward by means of the coil spring 52.

On the underside of the flange portion 55b of the slidable holder 55 in each of the polishing member holders 50A and 50B which are juxtaposed right and left, there are disposed the tubular scar-removing polishing member 5A and the buffing polishing member 5B, which are detachably attached, via a mounting member 57 consisting for example of a plane hook and loop fastener (which is marketed under the trademark of Velcro®), to the underside of the flange portion 55b in such a manner that the axes of the polishing members 5A and 5B become coaxial with the rotational axes Oa and Ob of the polishing member holders 50A and 50B, respectively.

Figure 10:
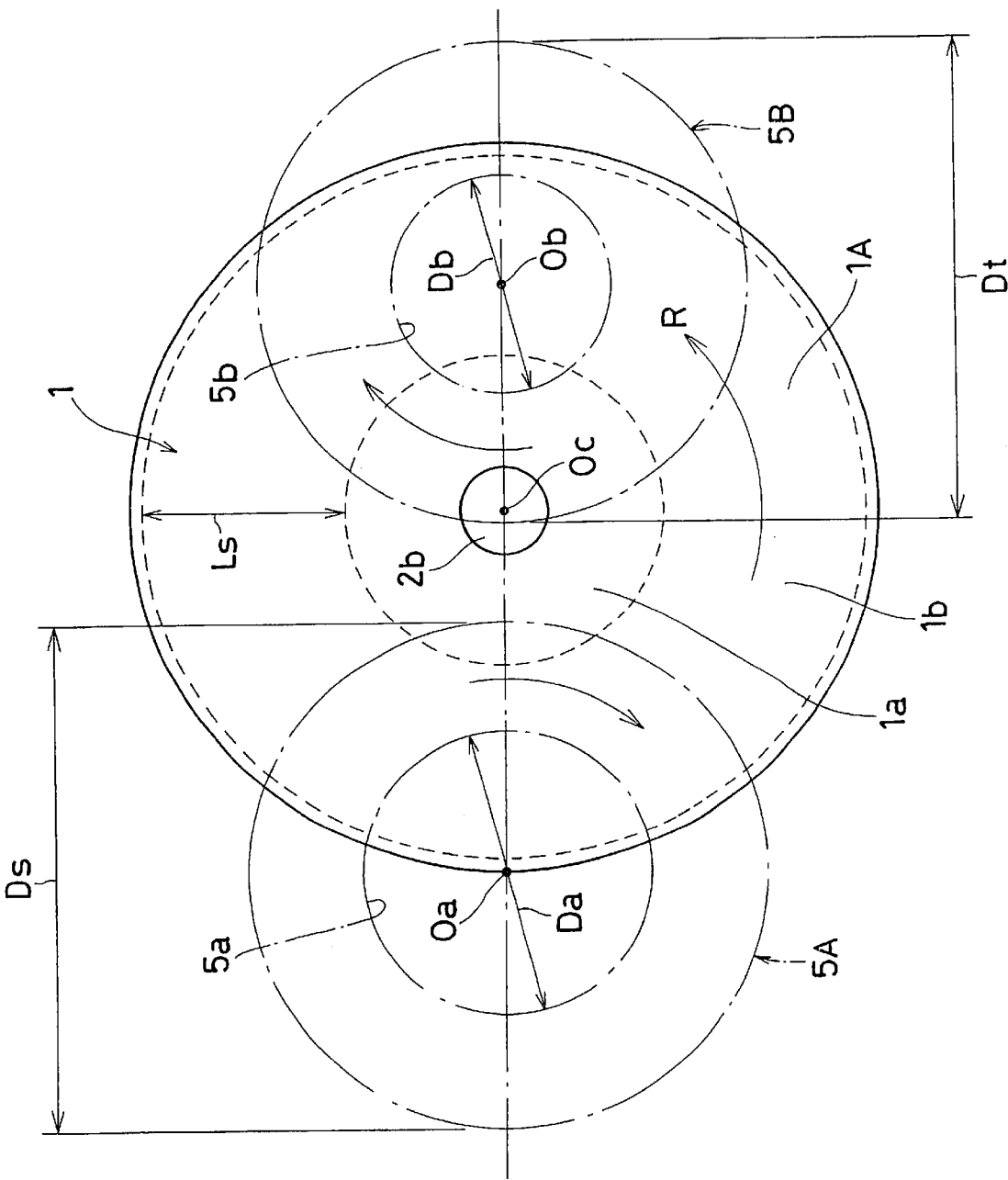
FIG. 10 is a plan view illustrating the layout of the polishing member of the disk cleaner shown in FIG. 1 relative to the position of the disk.

A scar-removing (roughing) material is attached to the scar-removing polishing member 5A, and a polishing material is attached to the buffing polishing member 5B. On the occasion of the polishing operation, the rotational axes Oa and Ob of the polishing member holders 50A and 50B are disposed perpendicular to the surface (the surface to be polished) 1A of the disk 1, and the underside surfaces 5C of the polishing members 5A and 5B are press-contacted with the surface 1A of the disk 1. Further, as clearly seen from FIG. 10, the rotational axes Oa and Ob of the polishing member holders 50A and 50B are disposed so as to be positioned on the straight line which passes through the rotational axes Oc of the turntable 20 and of the rotational shaft 25 (the spindle 26), and at the same time, the rotational diameters Ds of the scar-removing polishing member 5A as well as the rotational diameters Dt of the buffing polishing member 5B are made larger than the width Ls (as measured in the radial direction of the disk) of the recording region 1b to be polished of the recording surface (polishing surface) 1A of the disk 1, so that part of the marginal portion of each of the polishing member holders 50A and 50B is allowed to extend over the non-recording region 1a located at the center of the disk 1 as well as over the outside of the disk 1.

Furthermore, in the embodiment, the left side slidable elevating member 31 which is provided with the polishing member holder 50A as well as the right side slidable elevating member 32 which is provided with the polishing member holder 50B are enabled to selectively move close to or away from the polishing surface 1A by means of a cam type elevating mechanism 60, thereby permitting the scar-removing polishing member 5A and rotational buffing polishing member 5B to be separately engaged with the polishing surface 1A of the disk 1.

Figure 4:
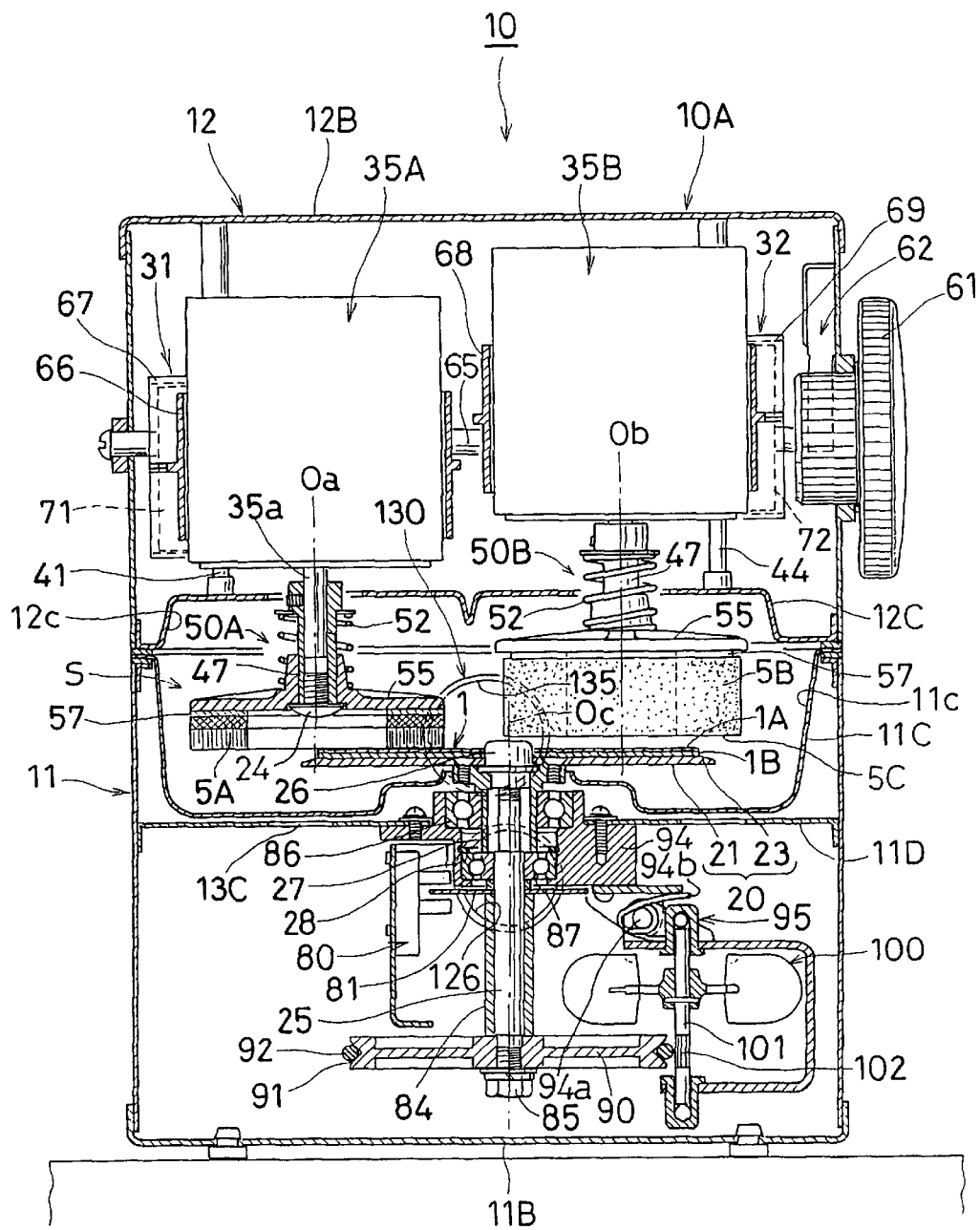
FIG. 4 is a cross-sectional view taken along the line IV—IV of FIG. 1.
Figure 5:
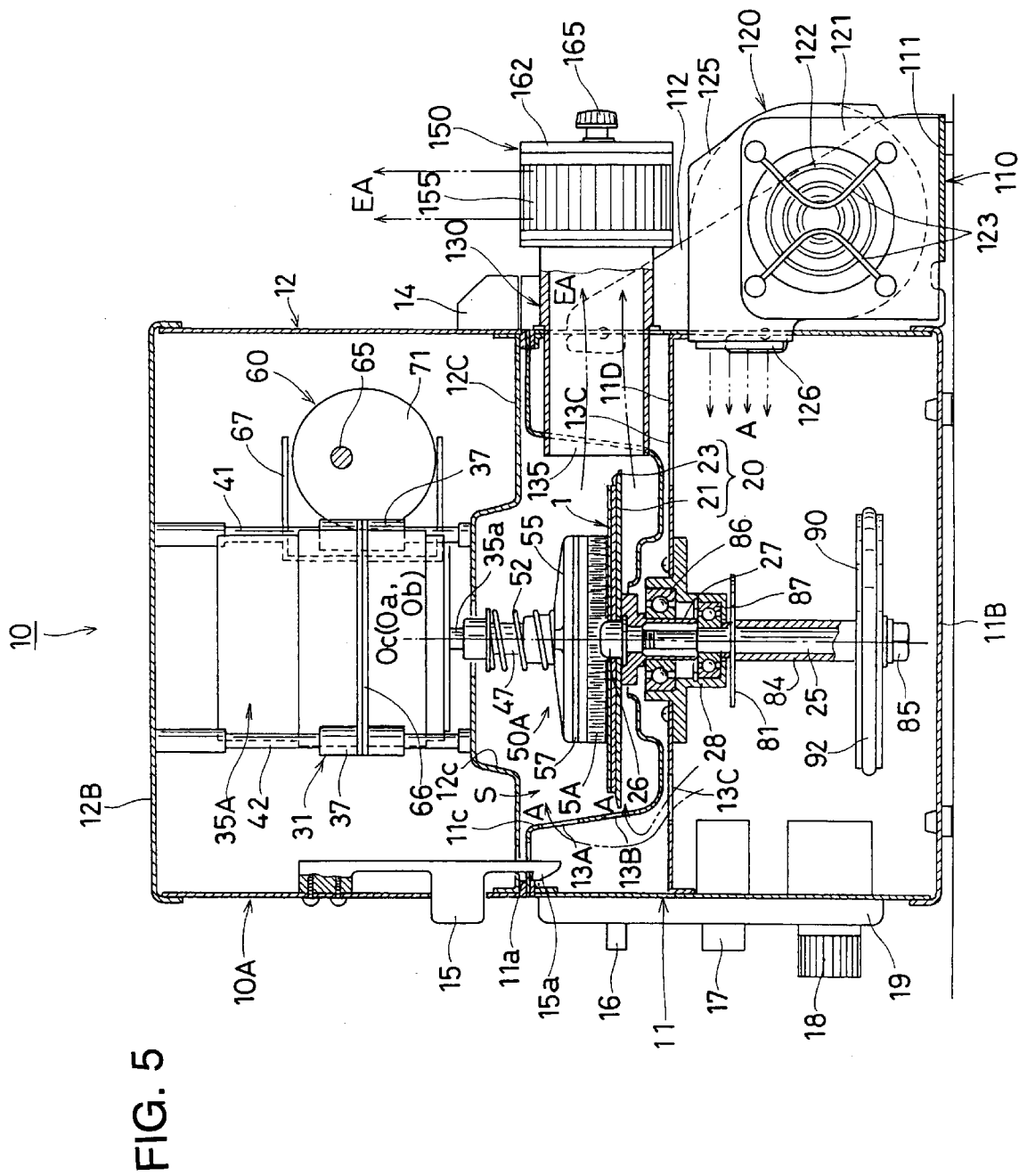
FIG. 5 is a cross-sectional view taken along the line V—V of FIG. 1.
Figure 6:
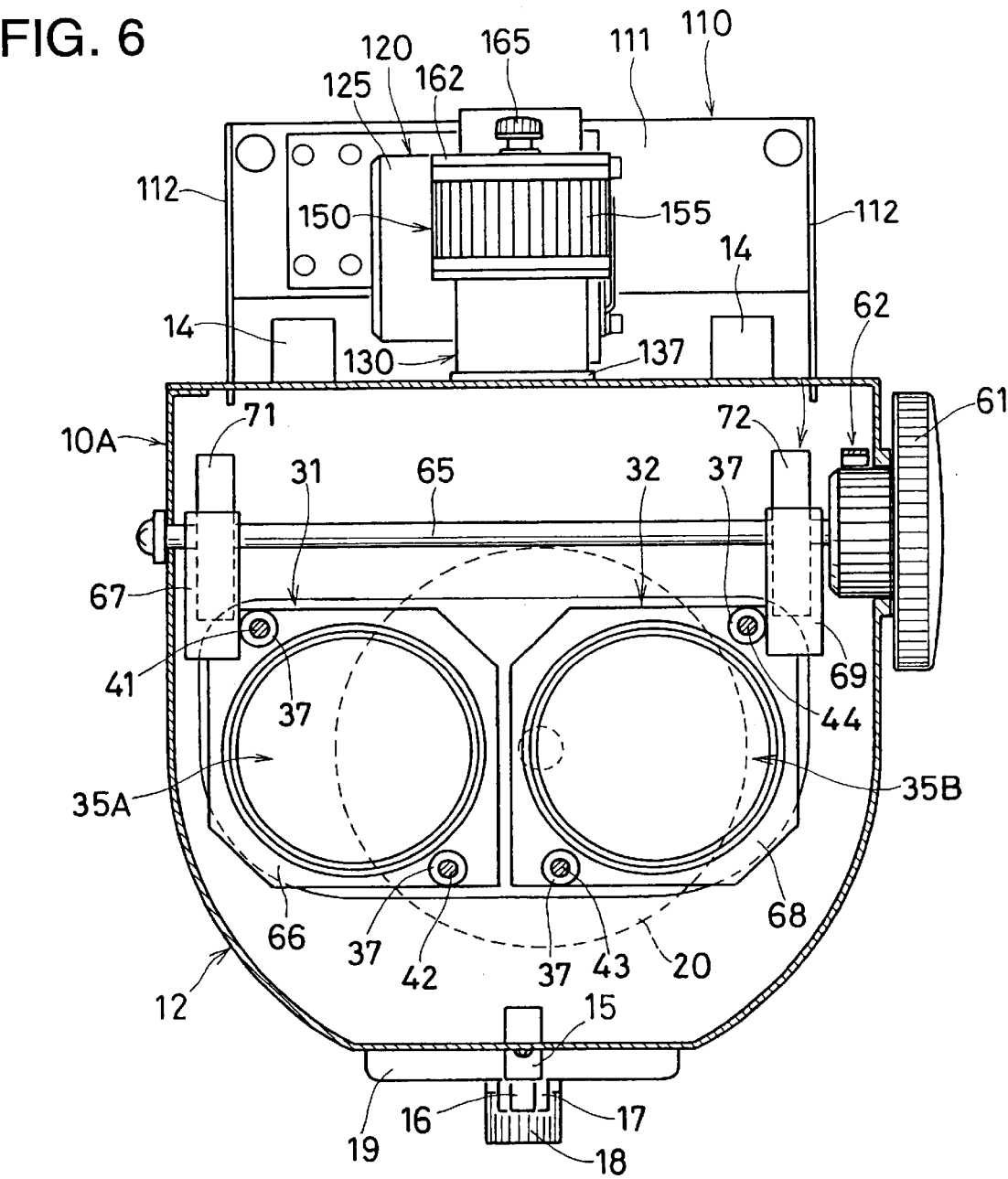
FIG. 6 is a cross-sectional view taken along the line VI—VI of FIG. 1.

As clearly seen from FIGS. 5 and 6 together with FIG. 4, the cam type elevating mechanism 60 is constituted by a selection dial 61 disposed on the right side of the upper housing 12; a manipulating shaft 65 extending from the right side to the left side of the upper housing 12 and integrally and rotatably fixed through a right end portion thereof to the selection dial 61; a click stop 62 which is disposed at an inner portion of the upper housing 12 located near a right end portion of the manipulating shaft 65 and on the inner side of the selection dial 61; a left disk cam 71 which is eccentrically secured to a left side portion of the manipulating shaft 65, i.e., slightly offset leftward from the central portion of the manipulating shaft 65, and is provided with a lift face (peripheral surface) which is adapted to be slidably contacted with the left cam lift plate 67 of the left side slidable elevating member 31; and a right disk cam 72 which is eccentrically secured to a right side portion of the manipulating shaft 65, i.e., slightly offset rightward from the central portion of the manipulating shaft 65, the secured position thereof to the manipulating shaft 65 being differentiated by a phase difference in angle of 180 degrees relative to the secured position of the left disk cam 71, and is provided with a lift face (peripheral surface) which is adapted to be slidably contacted with the right cam lift plate 69 of the right side slidable elevating member 32.

According to the cam type elevating mechanism 60, upon every 180 degrees of the rotation of the selection dial 61, the left side slidable elevating member 31 and the right side slidable elevating member 32 are alternately enabled to descend, thereby causing the tubular scar-removing polishing member 5A and the buffing polishing member 5B each secured to the polishing member holders 50A and 50B, respectively, to be alternately press-contacted with the polishing surface 1A of the disk 1. Furthermore, the cam type elevating mechanism 60 is constructed such that through the adjustment of the manipulating angle of the selection dial 61, the descended position of the left side slidable elevating member 31 and the right side slidable elevating member 32, i.e., the magnitude of contacting force of the tubular scar-removing polishing member 5A and of the buffing polishing member 5B against the polishing surface 1A of the disk 1 can be suitably adjusted. FIG. 4 shows a state wherein the tubular scar-removing polishing member 5A is placed at the lowest position thereof, while the buffing polishing member 5B is at the highest position thereof.

The upper housing 12 is provided at a lower front portion thereof with a handle 15 having a locking portion 15a for the convenience of opening or closing the upper housing 12. The locking portion 15a of the handle 15 can be bent in the inner or outer direction on the occasion of opening and closing the upper housing 12, thereby enabling the locking portion 15a to be inserted into and engaged with a locking hole 11a provided at a front portion of the upper plate 11C of the lower housing 11. As shown in FIG. 2, a pair of buffer type engaging members 79, which are adapted to be engaged with the hinge members 14 when the upper housing 12 is fully opened, are attached to an upper portion of the rear side of the lower housing 11.

A control panel 19 is attached to a front portion of the outer wall of the lower housing 11. A start switch 16, an operation lamp 17, a timer dial 18 for setting the polishing time, etc., are mounted on the control panel 19. Additionally, as shown in FIG. 3, there is also a safety switch 75 for switching the power source from an OFF state to an ON state, wherein the safety switch 75 is adapted to be pushed down by the bottom plate 12C of the upper housing 12 when the upper housing 12 is closed. The disk cleaner 10 of the embodiment is designed such that unless the safety switch 75 is in the state of ON, i.e., unless the upper housing 12 is closed, the gear motors 35A and 35B will not be actuated even if the start switch 16 is pushed.

In addition to the aforementioned structure, the disk cleaner 10 according to the embodiment is further provided with the aforementioned blower functioning as an air cooling apparatus for feeding outside air to the polishing surface 1A of the disk 1 for forcibly cooling the disk 1, especially when the disk 1 to be polished is a DVD. As shown in FIG. 2, the blower 120 is fixedly mounted on the rear of the lower housing 11 of the main body 10A on a support 110, which is constituted by a bottom plate 111 and a pair of triangular side plates 112.

The blower 120 is a centrifugal type blower called a "sirocco" blower, which comprises an air inlet port 122 with a pair of L-shaped guards 123, and a main body 121 having therein a motor and an impeller, the main body 121 being placed on the bottom plate 111 of the support 110. Further, as shown in FIG. 5, a rear end portion (a discharge port 126) of a volute case 125 which is contiguous with the main body 121 extends into the interior of the lower housing 11.

During the operation of the blower 120, the outside air A is introduced into the inlet port 122 and blown out from the discharge port 126. The air A flows from the rear side of the lower housing 11 toward the front side of the lower housing 11.

In the embodiment, the inner retaining plate 11D of the lower housing 11 is provided with a plurality of through-holes 13C. Further, the upper plate 11C is provided, at the front side of the dished recess 11c thereof, with four relatively large upper air-conducting ports 13A which are horizontally arrayed at an upper place, and with three relatively small lower air-conducting ports 13B which are horizontally arrayed at a lower place, thereby making it possible to effectively ventilate an upper portion of the closed space S where heated air is more likely to be retained therein. On the opposite side of the air-conducting ports 13A and 13B, i.e., on the rear side of the dished recess 11c, there is disposed a discharge pipe 130 acting as an air discharging structure, which is horizontally arranged with the inlet opening 135 thereof extending into the dished recess 11c (see FIG. 7).

Figure 8:
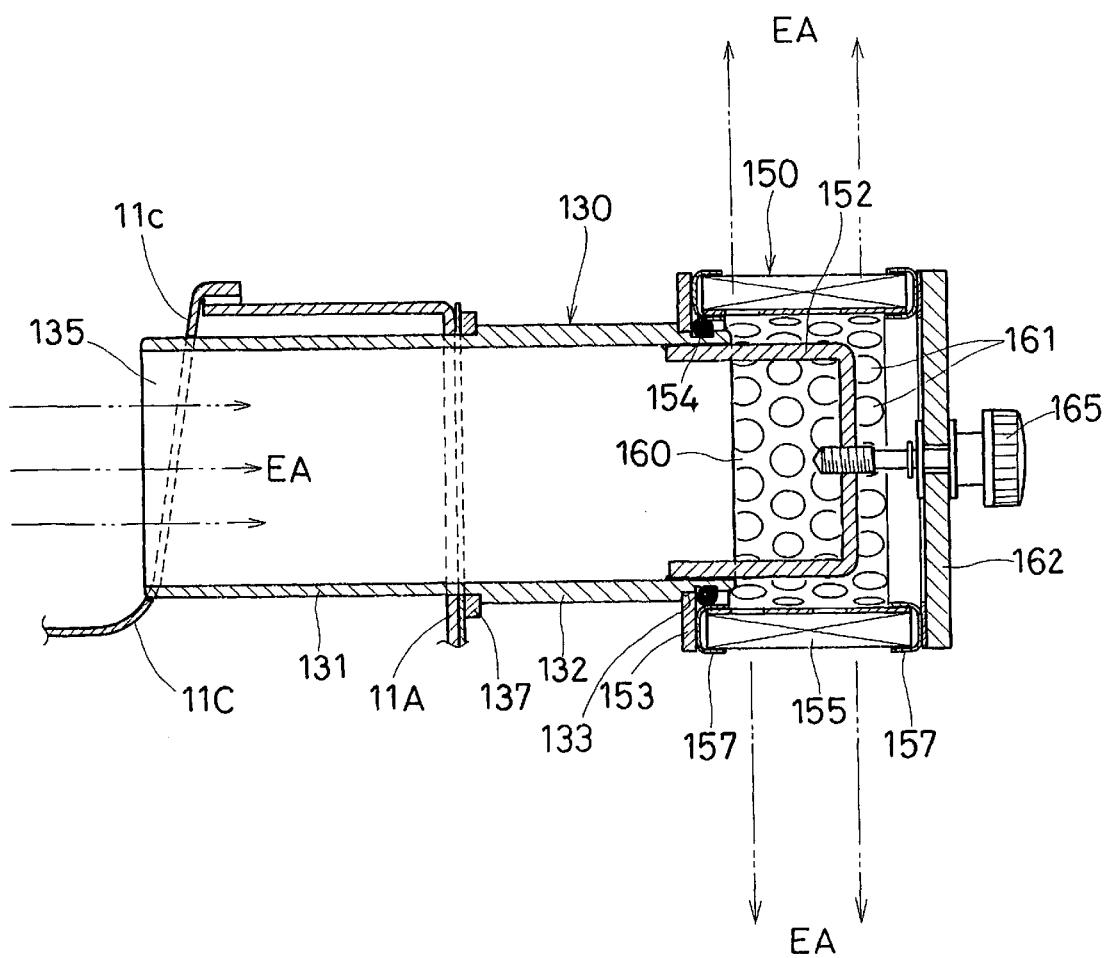
FIG. 8 is a cross-sectional view taken along the line VIII—VIII of FIG. 7.

As shown in FIG. 8, the discharge pipe 130 is formed of a stepped cylindrical pipe essentially consisting of a thin-wall portion 131, which is inserted into the lower housing 11, and a thick-wall portion 132, which protrudes out of the rear side of the lower housing 11. The stepped portion of the discharge pipe 130 is fixed, via a mounting plate 137, to an upper rear side portion of the peripheral plate 11A of the lower housing 11.

An air cleaner 150 is detachably secured to the outer end of the protruding tubular portion 132 of the discharge pipe 130. More specifically, a U-shaped fixing plate 152 is fixed by means of welding, for instance, to the inner wall of the outer end of the protruding tubular portion 132, and at the same time, a locking plate 153 is pressingly inserted into the stepped portion 133 which is formed at the outer end of the protruding tubular portion 132. The air cleaner 150 is constituted by: a bellows type filter element 155 which is formed of gas-permeable filter paper formed into a bellows-like cylindrical configuration; a reinforcing inner tube 160 which is formed of a punched metal having a large number of through-holes 161 and disposed inside the filter element 155 so as to retain the cylindrical configuration of the filter element 155; a pair of annular caps 157 each having a U-shaped cross section and fitted on both ends in the longitudinal direction (in the horizontal direction in FIG. 8) of a cylindrical body consisting of the filter element 155 and the reinforcing inner tube 160; a cap member 162 for closing the outer opening of the filter element 155; and a mounting screw member 165 which is rotatably attached to the cap member 162. Thus, it is made possible, through the screw-engagement of the mounting screw member 165 with the U-shaped fixing plate 152, to pressingly fasten, owing to the pressing force of the cap member 162, the filter element 155, the reinforcing inner tube 160 and the annular caps 157 onto the locking plate 153. A sealing O-ring 154 is interposed between the outer circumferential surface of the protruding tubular portion 132 and the annular caps 157.

When it is desired to remove any scar or stain formed on the surface of the disk 1 by making use of the disk cleaner 10 of the embodiment, the upper housing 12 is opened at first (the state shown in FIG. 3), and after the disk 1 is placed on the turntable 20 with the surface 1A thereof to be polished being directed upward, the upper housing 12 is closed. After determining whether or not there is any scar on the surface of the disk 1, the selection of the kind of polishing member to be employed, i.e., the scar-removing polishing member 5A or the buffing polishing member 5B, is performed by turning the selection dial 61 (when there is no scar and only a stain is observed, the buffing polishing member 5B is employed), and at the same time, the pressing force of the selected polishing member 5A or 5B against the disk 1 is adjusted, after which the timer dial 18 is set suitably and the start switch 16 is pushed.

As a result, the polishing member 5A or 5B thus selected by the manipulation of the selection dial 61 is allowed to descend, thus pressing the polishing member 5A or 5B against the polishing surface 1A of the disk 1. Then, the polishing member 5A or 5B thus pressed onto the polishing surface 1A of the disk 1 is allowed to rotate under the condition wherein the rotational axes Oa and Ob of the polishing member holders 50A and 50B are kept perpendicular to the polishing surface 1A of the disk 1. Concurrently with the rotation of the polishing member holder 50A or 50B, the disk 1 is also caused to rotate due to the frictional force between the polishing surface 1A of the disk 1 and the polishing member holder 50A or 50B. As a result, concurrently with the polishing of the polishing surface 1A of the disk 1, the rotational driving force generated by the frictional force between the disk 1 and the polishing member holder 50A or 50B is transmitted, via the turntable 20, the rotational shaft 25 and the fan-driving wheel 90, to the loading fan 100 (i.e., the rotatable axle 101), thereby enabling the loading fan 100 to rotate in a mechanically interlocked manner with the rotation of the turntable 20.

If it is desired to switch the polishing member to be used from the scar-removing polishing member 5A to the buffing polishing member 5B, the selection dial 61 is turned by an angle of 180 degrees, after which the aforementioned procedures are repeated. When the polishing of the disk 1 has been finished, the upper housing 12 is opened and the disk 1 is taken out of the disk cleaner 10, and the aforementioned cleaning procedures are repeated for another disk as described above.

As described above, since the rotational axes Oa and Ob of the scar-removing polishing member 5A and buffing polishing member 5B are perpendicular to the polishing surface 1A of the disk 1 during the polishing operation in the case of the disk cleaner 10 of the embodiment, the contact of the polishing member holders 50A and 50B against the polishing surface 1A of the disk 1 can be made uniform. As a result, it becomes possible to prevent the generation of localized abrasion of the polishing members 5A and 5B, thereby making it possible to retain the flatness of the polishing surface (bottom surface) 5C of the polishing members 5A and 5B, whereby the generation of undesirable movement such as waving of the disk 1 can be also prevented.

Additionally, since the disk 1 is allowed to rotate by way of the frictional force between the polishing surface 1A of the disk 1 and the polishing members 5A and 5B, the finished state of the disk 1 can be made more excellent as compared with that of the disk which has been polished by forcibly rotating the disk by means of a motor, and at the same time, since any excessive force is not imposed on the disk 1, damage to the disk 1 by the operation of the polishing members 5A and 5B can be prevented. Furthermore, since the polishing members 5A and 5B are tubular, the generation of undesirable force which causes the disk to rotate in the direction opposite to the predetermined rotational direction R that may be generated due to the frictional force between the disk 1 and the polishing members 5A and 5B can be effectively alleviated.

Additionally, since it is no longer required to employ a motor, etc., for rotating the disk 1, the temperature rise of the disk due to the heat to be generated from the motor, etc., can be effectively suppressed, and at the same time, the apparatus can be made more compact and the manufacturing cost of the apparatus can be saved.

Furthermore, since the loading fan 100 is disposed so as to enable it to rotate in mechanical association with the rotation of the turntable 20, mounting the disk 1 for the purpose of imposing a prescribed magnitude of load to suppress the rotation of the disk 1 by the frictional force between the polishing surface 1A and the polishing members 5A and 5B, the frictional force between the polishing surface 1A of the disk 1 and the polishing members 5A and 5B can be easily and suitably controlled, thereby making it possible to effectively polish the surface 1A of the disk 1.

Moreover, since a pair of polishing member holders 50A and 50B are enabled to selectively move close to or away from the disk 1 by means of the cam type elevating mechanism 60, thereby enabling the polishing members 5A and 5B secured respectively to the polishing member holders 50A and 50B to be separately engaged with the polishing surface 1A of the disk 1, what is required in the operation of removing a scar or a stain on the disk 1 is only to determine which of the polishing members, the scar-removing polishing member 5A or the buffing polishing member 5B, should be pressed down to the disk 1. It is no longer required to exchange the polishing members with each other, thereby making it more convenient to use the disk cleaner. Additionally, since the magnitude of the pressing force of the polishing members 5A and 5B against the polishing surface 1A of the disk 1 can be adjusted by means of the cam type elevating mechanism 60, it is possible, even if the polishing members 5A and 5B are worn out or deformed due to use, to apply a preset magnitude of pressing force to the polishing members 5A and 5B so as to adequately remove the scar or stain from the disk 1.

Furthermore, since the polishing members 5A and 5B are tubular and the bottom surface 5C thereof is designed to be contacted with the polishing surface 1A, the pressing force against the disk 1 of every portion of the polishing members 5A and 5B tends to become uniform, thereby making it possible to uniformly polish the surface 1A of the disk 1.

Since the rotational diameters Ds of the scar-removing polishing member 5A as well as the rotational diameters Dt of the buffing polishing member 5B are made larger than the width Ls (as measured in the radial direction of the disk) of the recording region 1b to be polished of the polishing surface 1A of the disk 1 the entire region of the polishing surface 1A of the disk 1 to be polished can be effectively polished without necessitating the movement of the polishing members 5A and 5B and/or the disk 1 in a radial direction of the disk 1, thereby making it possible to simplify the structure and mechanism of the apparatus.

Still more, since the polishing members 5A and 5B are always urged toward the disk 1 during the polishing operation by means of the coil spring 52, the pressing force against the disk 1 of the contacting surfaces of the polishing members 5A and 5B tends to become uniform, thereby making it possible to uniformly polish the polishing surface 1A of the disk 1.

Figure 7:
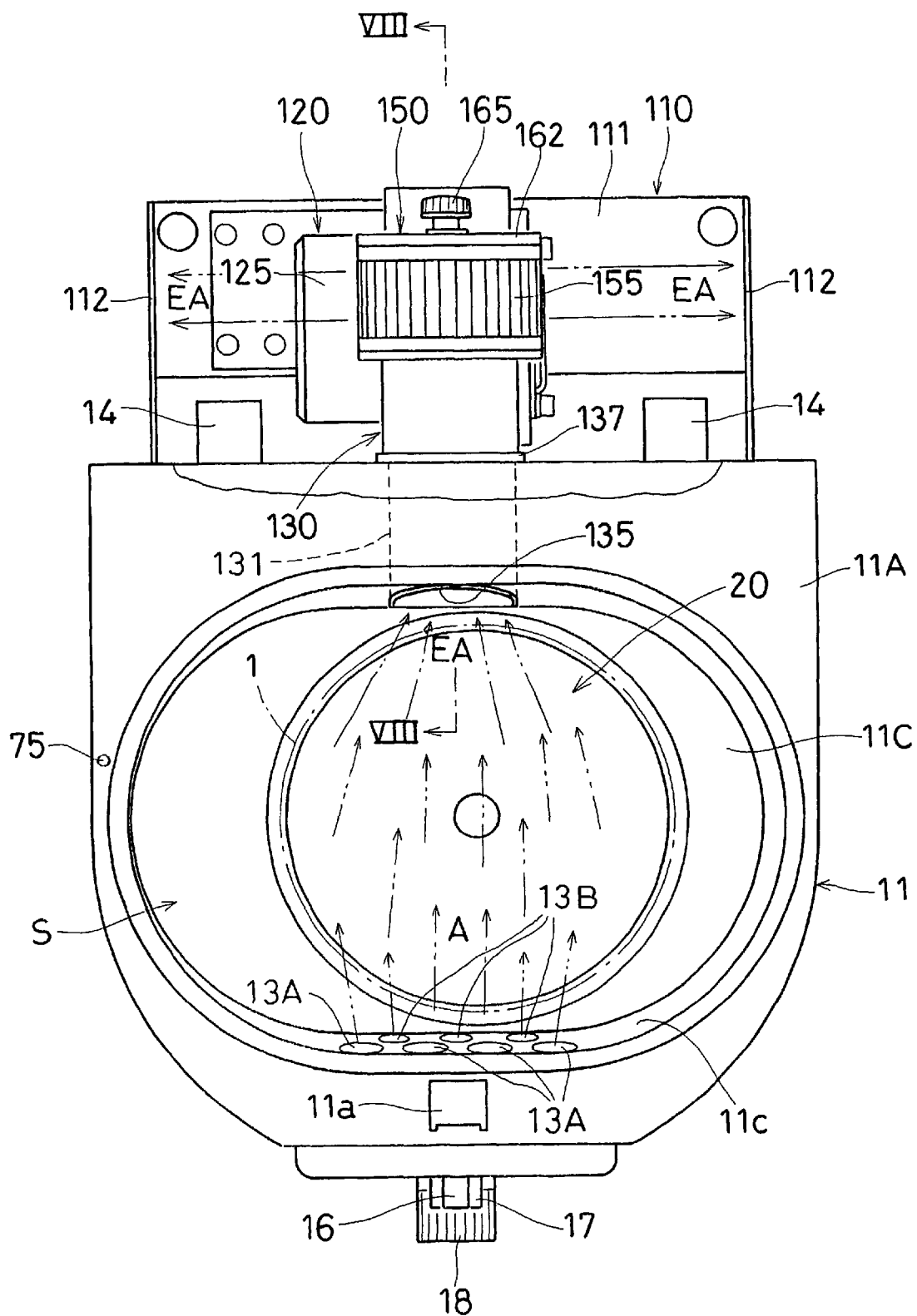
FIG. 7 is a plan view of the lower housing shown in FIG. 1.

In addition to the aforementioned effects and advantages, the disk cleaner 10 of the embodiment is also featured in that the blower 120 is designed to be actuated synchronous with the polishing of the disk 1 by means of the polishing members 5A and 5B. As shown in FIG. 5, during the operation of the blower 120, the outside air A is sucked into the inlet port 122 and blown out from the discharge port 126, allowing the air A to flow from the rear side of the lower housing 11 toward the front side of the lower housing 11. The outside air A which has been blown into the lower housing 11 is conducted via the through-holes 13C formed in the inner retaining plate 11D and via the air-conducting ports 13A and 13B formed in the front side of the dished recess 11c of the upper plate 11C, to the closed space S formed between the upper plate 11C of the lower housing 11 and the bottom plate 12C of the upper housing 12. Thereafter, as shown in FIG. 7, the air A passes across the disk 1 in the diametrical direction thereof, and then is introduced via the inlet port 135 into the discharge pipe 130 as an exhaust air EA comprising a heated gas, the exhaust air EA being ultimately discharged via the discharge pipe 130 and the air cleaner 150 out of the disk cleaner 10.

Due to the flow of the outside air A passing across the disk 1, the disk 1 is cooled and at the same time, the shavings of the disk 1 or the dust of polishing material are carried away by the outside air A. The shavings of the disk 1 and the dust of polishing material are subsequently caught by the air cleaner 150 as the exhaust air EA passes through the air cleaner 150, and hence only cleaned exhaust air EA is allowed to be discharged outside the apparatus.

According to the air cleaner 150 of the embodiment which is constructed as described above, since air cooling apparatus consisting of the blower 120 is provided to feed outside air A to the polishing surface 1A of the disk 1 so as to forcibly cool the disk 1, the temperature rise of the disk 1 due to the frictional heat to be generated during the polishing operation can be effectively suppressed. Therefore, even if the disk 1 to be polished is a DVD of 2-ply structure, the peeling of the adhered surfaces as well as the generation of cracks can be effectively inhibited.

Especially, since the air flow to be generated by the blower 120 is allowed to diametrically pass over the disk 1 being rotated, the entire surface of the disk 1 can be uniformly and effectively cooled.

Since the shavings of the disk 1 and the dust of polishing material which are generated during the polishing operation of the disk 1 are removed from the disk 1 and subsequently caught by the air flow to be generated by the blower 120, the air flow can be utilized as a waste-trapping air flow, so that it is no longer required to separately install a waste-trapping fan.

While the present invention has been explained in detail with reference to one embodiment, it will be understood that the present invention is not limited to the aforementioned embodiment, but can be varied without departing from the spirit and scope of the invention.

For example, although the disk cleaner 10 in the above embodiment is constructed to polish only one surface of a 5-inch disk such as a CD, etc., the disks to be treated by the disk cleaner 10 include disks differing in size, such as a laser disk, etc. Furthermore, the disk cleaner 10 can be modified in various ways so as to make it possible to treat both surfaces of a disk.

What is claimed is:

1. A disk cleaner, comprising:
    a polishing member that is rotated while it is pressed against a surface of a disk to be polished to thereby polish the surface of the disk;
    an air cooling apparatus that cools the disk by causing outside air to flow along the surface of the disk, the air cooling apparatus being incorporated integrally with the disk cleaner; and
    a main body on which the polishing member is mounted, wherein the air cooling apparatus is incorporated with the main body;
    wherein the main body includes a lower housing having an upper plate and an upper housing having a lower plate, wherein the plates form a substantially closed space in the main body, a hinge joins the upper housing to the lower housing such that the upper housing is movable away from the lower housing by pivoting about the hinge, wherein a turntable for supporting the disk is disposed in the closed space, and the polishing member is supported in the upper housing and is received in the closed space; and
    wherein the air cooling apparatus is associated with the lower housing and an air flow generated by the air cooling apparatus is introduced into the closed space from an air inlet port formed in upper plate of the lower housing, is directed to flow generally diametrically across the disk, and is discharged outside the main body.

2. The disk cleaner according to claim 1, wherein the main body is provided with an air discharging structure for discharging the air that has been used for cooling the disk out of the main body.

3. The disk cleaner according to claim 2, wherein the air discharging structure is provided with an air cleaner for trapping shavings of the disk and dust of the polishing member.

4. A disk cleaner, comprising:
    a polishing member that is rotated while it is pressed against a surface of a disk to be polished to thereby polish the surface of the disk; and
    an air cooling apparatus that cools the disk by causing outside air to flow along the surface of the disk, the air cooling apparatus being incorporated integrally with the disk cleaner;
    wherein the air cooling apparatus generates an air flow and causes the air flow to pass generally diametrically across the surface of the disk.

5. The disk cleaner according to claim 4, wherein the air cooling apparatus includes a blower.

* * * * *